(12) United States Patent
Hara

(10) Patent No.: US 7,830,623 B2
(45) Date of Patent: Nov. 9, 2010

(54) CONNECTING METHOD OR LENSES FOR AN IMAGING-DEVICE, LENS UNIT CONSTRUCTED BY USING THE CONNECTION METHOD AND IMAGING-DEVICE COMPRISING THE LENS UNIT

(75) Inventor: Tatsunori Hara, Saitama (JP)

(73) Assignee: Tamron Company, Ltd., Saitama (JP)

( * ) Notice: Subject to any disclaimer, the term of this patent is extended or adjusted under 35 U.S.C. 154(b) by 159 days.

(21) Appl. No.: 12/349,112

(22) Filed: Jan. 6, 2009

(65) Prior Publication Data
US 2009/0174954 A1 Jul. 9, 2009

(30) Foreign Application Priority Data
Jan. 9, 2008 (JP) ............................. 2008-002299

(51) Int. Cl.
G02B 7/02 (2006.01)
(52) U.S. Cl. ....................................... 359/811; 359/819
(58) Field of Classification Search ................. 359/811, 359/819, 796, 820, 822, 823, 826
See application file for complete search history.

(56) References Cited

U.S. PATENT DOCUMENTS 7,755,858 B2 * 7/2010 Chen .......................... 359/819

FOREIGN PATENT DOCUMENTS

| JP | 56149010 A | 11/1981 |
| JP | 62153908 A | 7/1987 |
| JP | 2004205574 A | 7/2004 |
| JP | 3739295 A | 1/2006 |

* cited by examiner

Primary Examiner—Timothy J Thompson
(74) Attorney, Agent, or Firm—Rothwell, Figg, Ernst & Manbeck, P.C.

(57) ABSTRACT

To connect N lenses to construct a lens unit for an imaging-device in series, (n−1)-th (where $2 \leq n$ (integer)$\leq N$) lens having an outer periphery rim region which extends with a certain thickness from an outer periphery edge end portion of the lens region directing to the side of the adjacent nth lens and the outer periphery rim region which has a circular-arc tapered surface inclined with respect to an optical axis on a outer part of the lens region, and the nth lens having a bulgy-protrusion-shaped portion with head-top portion milled to be round along an outer part of the lens region on a surface of an outer periphery rim region opposed to the (n−1)-th lens are arranged, and lens position adjustment is made by putting the bulgy protrusion-shaped portion to the circular-arc tapered surface to perform point contact.

9 Claims, 9 Drawing Sheets (a)

(b)

(c)

(d)

(a)                      (b)

(a)  (b)

(a)  (b)  (C)

(a)   (b)

(a)

(b)

(a)　　　　　　　(b)

CONNECTING METHOD OR LENSES FOR AN IMAGING-DEVICE, LENS UNIT CONSTRUCTED BY USING THE CONNECTION METHOD AND IMAGING-DEVICE COMPRISING THE LENS UNIT

BACKGROUND OF THE INVENTION

1. Field of the Invention

The present invention relates to a connecting method of lenses for an imaging-device, a lens unit constructed by using the connecting method, and an imaging-device comprising the lens unit. More specifically, in a lens arrangement method for a lens unit composed of a plurality of lenses, the invention relates to a connecting method of lenses adjacent to each other in which the optical axis alignment of each of the lenses and the adjustment/correction of the lens-to-lens distance are easy and accuracy of the lens arrangement does not depend greatly on the shape of a lens housing.

2. Description of the Related Art

In recent years, it has been general to install an easy imaging-device to a mobile tool, such as a cell phone, a PDA and a laptop personal computer. And such imaging-device is required not only miniaturization but also higher-accuracy and higher quality for image recorded. In order to meet such requirements, for imaging elements such as CCD, C-MOS and the like, high-pixel designs are carried out. For optical lens systems, arranging of two or more lenses in combination is in trials to improve image quality. When a plurality of lenses are arranged in combination, the optical axis of each of the lenses should be arranged to be aligned in good accuracy to satisfactorily correct aberrant of the lenses. For this reason, methods of arranging a plurality of lenses in a lens housing with good accuracy have been studied.

In the conventional method for arranging a plurality of lenses in a lens housing, the methods fix to arrange each of the lenses by utilizing a shape in a lens housing formed on an inner wall of the lens housing. An example of such a lens arrangement is shown in FIG. 12.

FIG. 12 shows a sectional view of a lens unit 1 composed of three lenses in an optical axis direction. The lens unit is composed of a first convex lens 20, a first concave lens 21, a second convex lens 22, and a lens housing 8. As will be understood from FIG. 12, in order to fix to arrange the above-described three lenses in the certain positions respectively, a first tubing 26, a second tubing 27 and a third tubing 28 are provided with a certain diameter difference in an internal surface of the lens housing 8. Then each of the lenses 20, 21, 22 shaped to match the diameter of each of these tubings is sequentially arranged in the lens housing. Each of the lenses 20, 21, 22 inserted is arranged on each of the tubings 26, 27, 28 respectively. In this manner, each of the lenses is fixed to be arranged in the lens housing.

JP S62 153908 discloses a lens unit in which a plurality of lenses having a flange in an outer periphery portion which is thick in an optical axis direction to avoid affection on an image formation, are arranged in an optical axis direction. In the lens unit, the lenses are connected directly or indirectly via a spacer on side surfaces of flange to maintain a certain space, and the lenses are joined and fixed each other to maintain the relative positions. That is, the invention discloses a connecting method of lenses without using a lens housing by joining lenses together in the flange in which each of a flange in an outer periphery portion of the lenses are joined and fixed together.

JP 2004 205574 discloses "a lens unit comprising a first lens having a recess whose inner diameter is provided by the processing reference face of a first lens core die so as to have a lens core processing reference diameter; and a second lens having a projection whose outer diameter is provided by a second lens die having a processing reference diameter that is substantially the same as the lens core processing reference diameter, so as to have substantially the same lens core processing reference diameter. The projection of the second lens and the recess of the first lens are fitted together to connect the first and second lenses to each other." That is, the invention discloses the method to join the first lens and the second lens by fixing in which the recess provided in an outer periphery portion of a lens core of the first lens and a projection provided in an outer periphery portion of a lens core of the second lens are fitted together to join and fix the lenses together.

JP S56 149010 discloses "a plastic lens having a depressed surface in an optical axis direction, which is formed in the shape of a circular-arc cone having a center in an optical axis." That is, the invention discloses a method in which an outer periphery portion of a lens has a tapered surface in the form of a circular-arc cone having an axis in an optical axis, tapered surfaces of each of adjacent lenses are engaged with each other, depressed and fixed to connect the lenses together for arrangement.

JP 3739295 discloses an optical apparatus comprising a lens housing, a 1st lens being at least two or more lenses installed in the lens housing and having a conical surface with an optical axis as center at the rib inner wall part of the edge outer periphery part, and a 2nd lens having a conical surface engaged with the conical surface contacting to the rib inner wall part of the edge outer periphery part of the 1st lens with the optical axis as center on the rib outer wall part of the edge outer periphery part are prepared. The first lens has a vertical surface perpendicular to an optical axis and the lens housing has a vertical receiving surface abutting against a vertical surface of the first lens. The vertical surface of the first lens contact to the vertical receiving surface of the lens housing by inserting the first lens into the lens housing, and the conical surface of the inner wall of the rib on the first lens contact to the conical surface of the outer wall of the rib on the second lens to be installed in the lens housing. The second lens is fixed to the lens housing in such a manner that the edge outer periphery portion of the first lens is sandwiched by the circular-arc conical surface of the outer wall portion of the rib on the second lens and the vertical receiving surface of the lens housing. Due to the face contact of the conical surfaces, for the first lens and the second lens, a clearance is provided between opposed surfaces except the conical surfaces. The first lens and the second lens are simultaneously positioned in an optical axis and in an optical axis direction. That is, the invention discloses a method in which tapered surfaces formed in each of the lenses are utilized to join each other, whereby the lenses are connected together, and at the same time, the positioning of the lenses is finished and the lenses are joined and fixed together by contacting the outer periphery portion of each of the lenses to the inner wall surface of the lens housing.

SUMMARY OF THE INVENTION

However, when the method shown in FIG. 12 that arranges each of the lenses by using each tubing provided on an inner surface of a lens housing is applied, each of the arranged lenses is fixed in such a manner that the outer periphery portion of the lens contact to the inner periphery surface of the lens housing and, therefore, the alignment of the optical axis positions of the lenses and the arrangement accuracy of the lenses, such as the spacing between the lenses, depends on the formation accuracy of the inner wall surface formed on the inner surface of the lens housing. In such a case, in order to form the shape of the inner wall surface of the lens housing with good accuracy, it is required to improve accuracy of metal molds in production of lens housings and result remarkable increase of the production cost. In addition, when the alignment of the optical axis positions of the lenses is required, the fine adjustment of the lens positions in the lens housing after the arrangement of the lenses is made difficult and the optical axis alignment may be difficult also.

In the lens arrangement method disclosed in JP S62 153908, the adjacent lenses are connected together by joining the flanged portions provided in the outer periphery portions of lenses each other. Therefore, the spacing between the lenses to be connected is not dependent on the shape of the inner surface of the lens housing. However, the optical axis adjustment of the lenses to be connected together must be performed simultaneously with the joining of the flanged portions of the lenses. It means that the method is not desirable because processing will be more difficult when the sizes of the lenses used are smaller. In addition, the procedure to perform sufficient optical axis adjustment and connecting the lenses together with good accuracy will be more difficult when the lenses to be connected together are the larger number. Furthermore, as is stated in FIG. 5 of JP S62 153908 that the contact of the tapered surfaces together meets the quality requirement concerning the two factors of the lens spacing and the optical axis misalignment, the contact accuracy of the tapered surfaces is affected by deviation of the taper angle. But, it is difficult to form the taper angle of the tapered surfaces with good accuracy. As a result, it is difficult to perform accurate face contact with each other with the tapered surfaces.

The lens arrangement method disclosed in JP 2004 205574 is a method of connecting adjacent lenses together by the diameter fixing of the lenses. The method of connecting the lenses together makes it possible that the concave portion of the first lens and the convex portion of the second lens are fixed each other without generating a clearance. However, in the case of the method disclosed in JP 2004 205574, even when the concave portion of the first lens and the convex portion of the second lens miss diameter fixing, the first lens and the second lens never be arranged without a gap and a gap should occurs even though the clearance may be a micron meter order. Therefore, it is not desirable because it may results deviation in the optical axis misalignment of the lenses and also the direction of the misalignment, the quality of the lens unit may have certain deviation. Furthermore, when mass production for obtaining the lenses with optimum fixing condition by using the method disclosed in JP 2004 205574, a plurality of metal molds for lens production will be required, i.e. corrections of the metal molds may be essential for the optimization of the optical axis accuracy and the lens-to-lens spacing accuracy. In addition, from the standpoint of manufacturing techniques, complicated procedures are required to result increases of the management cost in lens manufacture. Moreover, it is difficult to change the fixing condition of the lenses that have already been fitted and reassembling and a fine adjustment in an optical axis adjustment might be difficult. Particularly, in the case of small lenses, corrections are difficult to bother the worker.

The lens arrangement method disclosed in JP S56 149010 is a method in which the outer periphery portion of each lens having a depressed surface in an optical axis direction formed in the shape of a circular-arc cone with axis in an optical axis. In addition, the depressed surfaces of adjoining lenses are contacting each other to connect the lenses together. Although the method connecting the lenses together by applying a depressing force in an optical axis direction to the circular-arc conical abutment surfaces may be difficult to perform good accuracy in the circular-arc conical connecting surfaces into contact with each other. In addition, because the depressed surfaces are wide to connect the lenses together by applying a depressing force in an optical axis direction to the circular-arc conical contact surfaces, the depressed surfaces may be pasted together during an optical axis adjustment to result difficulty in a fine adjustment of an optical axis. Furthermore, the method has the problem that the worker cannot accurately find out the contact position in the depressed surfaces of both lenses to be connected. Also in the method disclosed in JP 3739295, the depressed surfaces for connecting the lenses together by applying a depressing force in an optical axis direction to the circular-arc conical connecting surfaces are wide. It is similar to the method disclosed in JP S56 149010. Therefore, the depressed surfaces may be pasted together during an optical axis adjustment to result difficulty in a fine adjustment of an optical axis.

Therefore, the present inventors devoted themselves to studies in order to solve the above-described problems, and as a result, they finally succeed to solve the problems by applying a connecting method of lenses for an imaging-device as described below. An outline of the present invention will be described below.

Connecting method of lenses for an imaging-device relating to the present invention:

The connecting method of lenses for an imaging-device relating to the present invention is a method for connecting N lenses (where N (integer)≧2) for an imaging-device in series. In this method, (a) each of the N lenses has a lens region in a center part and an outer periphery rim region formed on an outer part of the lens region; (b) the first lens of adjacent two lenses to be connected together has an outer periphery rim region which extends with a certain thickness from an outer periphery edge end portion of the lens region directing to the side of the second lens and the outer periphery rim region which has a circular-arc tapered surface inclined with respect to an optical axis on a outer part of the lens region; (C) the second lens of the adjacent two lenses to be connected together to each other has a bulgy-protrusion-shaped portion with head-top portion milled to be round along an outer part of the lens region on a surface of an outer periphery rim region opposed to the first lens; and (D) lens position adjustment is made by putting the bulgy protrusion-shaped portion of the second lens to the circular-arc tapered surface of the outer periphery rim region of the first lens while performing point contact to join and fix the two lenses each other, then the first lens and the second lens are joined and fixed in the state that the circular-arc tapered surface of first lens and the bulgy-protrusion-shaped portion of the second lens keep a point contact.

It is preferred that a concrete method described below be applied among the connecting methods of imaging-device lenses relating to the present invention. This is a method of connecting N lenses (where N (integer)≧2) for an imaging-device in series, in which (i) each of the N lenses has a lens region in a center part and an outer periphery rim region formed on an outer part of the lens region; (ii) an (n−1)-th lens (where 2≦n (integer)≦N) among the N lenses (herein after "(n−1)-th lens") has an outer periphery rim region which extends with a certain thickness from an outer periphery edge end portion of the lens region directing to the side of an n-th lens among the N lenses (herein after "n-th lens"), and an inner periphery surface of the outer periphery rim region connecting to the lens region of the (n−1)-th lens has a bank-shaped circular-arc tapered surface inclined from the n-th lens side to a lens region of the (n−1)-th lens; (iii) an n-th lens (where $2 \leqq n$ (integer)$\leqq N$) has a bulgy-protrusion-shaped portion with head-top portion milled to be round along an outer part of the lens region on a surface of an outer periphery rim region opposed to the (n−1)-th lens; and (iv) lens position adjustment is made by putting the bulgy protrusion-shaped portion of the n-th lens to the circular-arc tapered surface of the outer periphery rim region of the first lens while performing point contact to join and fix the two lenses each other, then the (n−1)-th lens and the n-th lens are joined and fixed in the state that the circular-arc tapered surface of (n−1)-th lens and the bulgy-protrusion-shaped portion of the n-th lens keep a point contact.

In the connecting method of lenses for an imaging-device relating to the present invention, it is preferred that the circular-arc tapered surface formed in the outer periphery rim region of the (n−1)-th lens has a sectional inclination angle in the range of 30° to 60° with respect to an optical axis.

On the other hand, in the connecting method of lenses for an imaging-device relating to the present invention, it is preferred that the bulgy-protrusion-shaped portion formed in the outer periphery rim region of the n-th lens is formed along an outer part of the lens region of the n-th lens, and that the width-direction sectional shape of the bulgy-protrusion-shaped portion is a roughly semicircular-arc shape or a dome shape.

Furthermore, it is preferred that the bulgy-protrusion-shaped portion formed in the outer periphery rim region of the n-th lens is a continuous or discontinuous shape along an outer part of the lens region of the n-th lens.

In the connecting method of lenses for an imaging-device relating to the present invention, it is preferred that all of N imaging-device lenses (where N (integer)$\geqq 2$) used are resin-based lenses.

In the connecting method of lenses for an imaging-device relating to the present invention, it is also preferred that N imaging-device lenses (where N (integer)$\geqq 2$) used are combination of a resin-based lenses and a glass-based lenses.

Lens Unit Relating to the Present Invention:

The lens unit obtained by connecting N lenses (where N (integer)$\geqq 2$) in series by using the connecting method of N lenses for an imaging-device in any one of the above-described aspects.

Imaging-Device Relating to the Present Invention:

The imaging-device comprising a lens unit relating to the present invention is that the N lenses (where N (integer)$\geqq 2$) are connected in series and is installed in a lens housing.

When the connecting method of lenses for an imaging-device relating to the present invention is applied in connecting a plurality of lenses, it will be made possible to make the contact positions of the lenses clear and free from deviations, to minimize errors in the lens-to-lens spacing of the lenses, and to make it free from the optical axis alignment of the lenses, without a great dependence on the shape of the inner wall surface in a lens housing that houses the lenses. In addition, even after the positioning of the lenses is finished, the lenses can be easily separated to accurately perform the adjustment of both the optical axis and the lens-to-lens spacing of the lenses. Therefore, in the positioning of the lenses, it is made possible repeating procedure of the adjustment of the connection positions of the lenses so that the optical performance of each of the lenses is given full play. As a result, the lens unit obtained by connecting lenses together by using the connecting method of lenses for an imaging-device relating to the present invention is excellent in accuracy of both the optical axis of a plurality of lenses and the lens-to-lens spacing to perform superior optical characteristics. Furthermore, as just a fixing of one lens constituting the lens unit to a shape formed on the inner periphery wall surface of the lens housing is required at least in housing process of the lens unit in a lens housing when plurality of lenses connected in the lens are arranged in the housing, the assembling of the lenses as an imaging-device is made easy and a low cost is required.

DETAILED DESCRIPTION OF THE PREFERRED EMBODIMENTS

An embodiment of the connecting method of lenses for an imaging-device relating to the present invention will be described below with reference to the accompanying drawings.

Embodiment of the Connecting Method of Lenses for an Imaging-Device Relating to the Present Invention:

The connecting method of lenses for an imaging-device relating to the present invention is a method for connecting N lenses (where N (integer)$\geqq 2$) for an imaging-device in series. Each of the N lenses has a lens region in a center part and an outer periphery rim region formed on an outer part of the lens region. By the way, in the present invention, the outer periphery rim region of a lens refers to the whole of a region present on the outer part of the lens region that functions as a lens.

Figure 1:
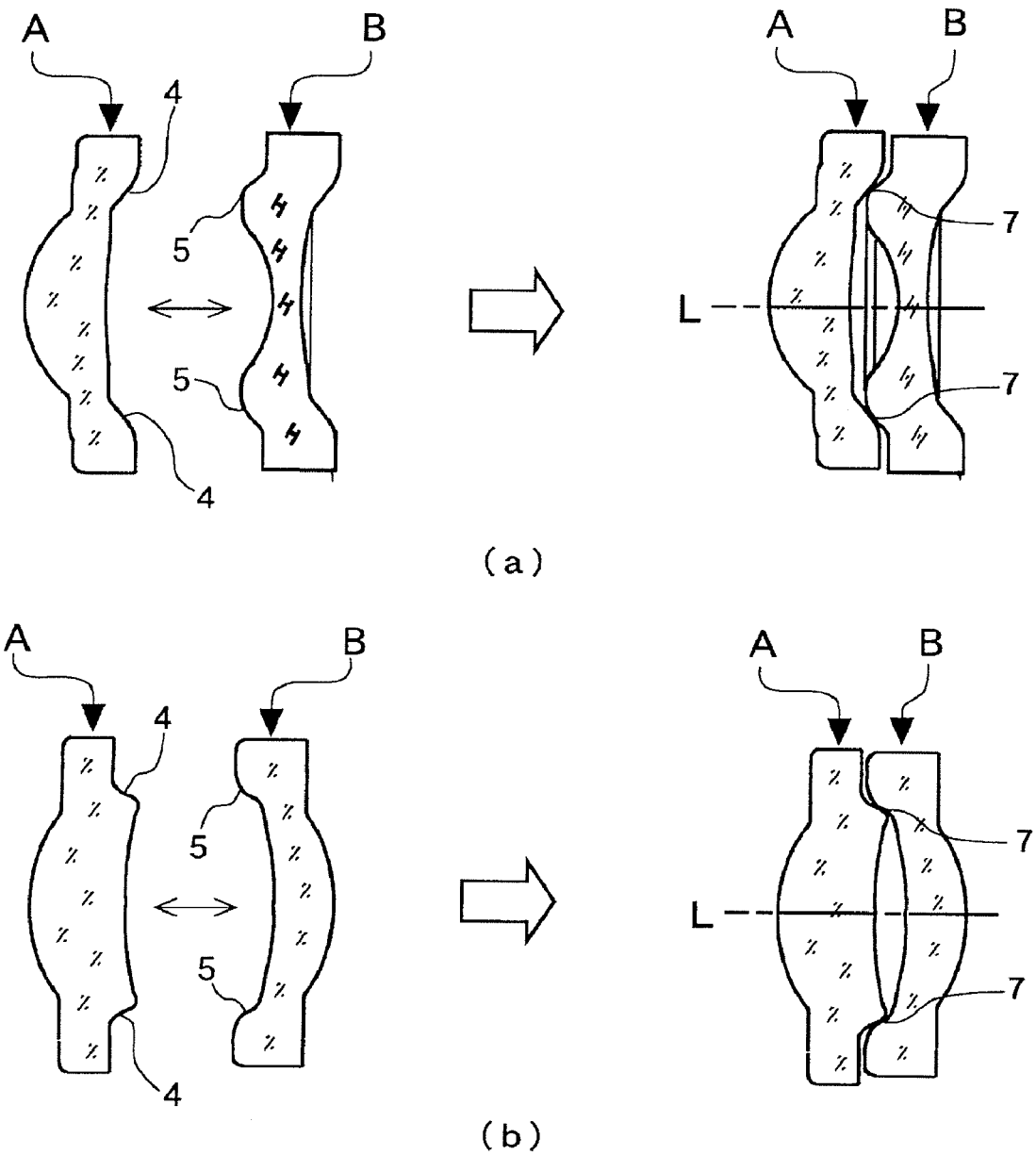
FIGS. 1(a) and 1(b) are cross sectional view in optical axis direction schematically showing typical examples of connecting two lenses by using a connecting method relating to the present invention.
Figure 2:
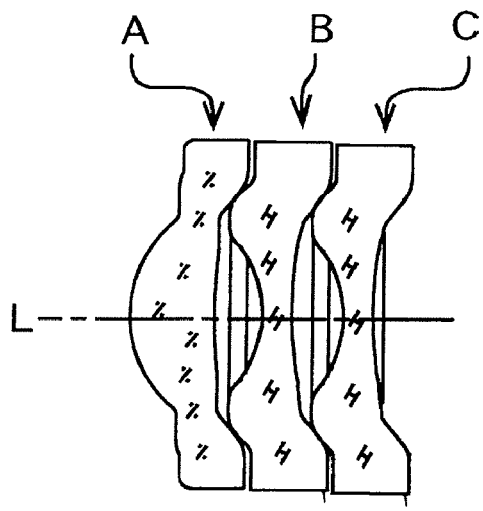
FIGS. 2(a) to 2(D) are cross sectional view in optical axis direction schematically showing typical examples of connecting three lenses by using a connecting method relating to the present invention.
Figure 2:
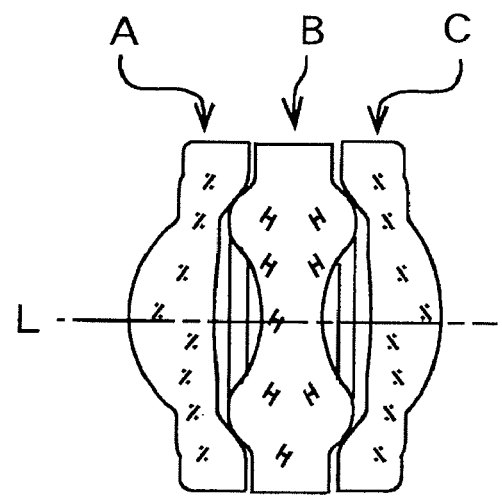
Figure 2:
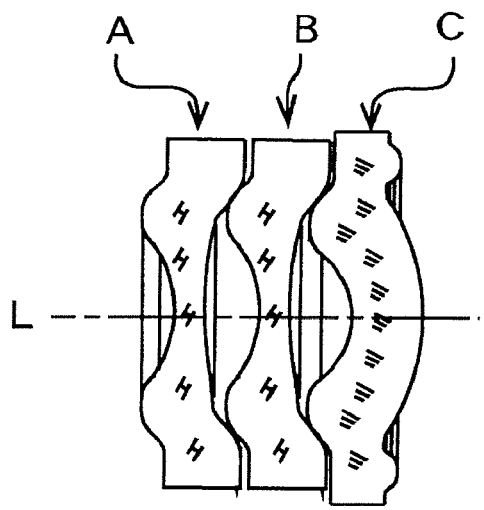
Figure 2:
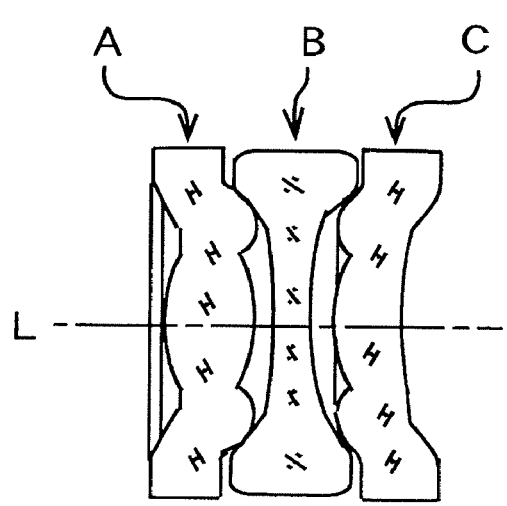

To make the understanding of the connecting method of the present invention easy, an image of connecting two lenses is shown in FIGS. 1(a) and 1(b) as a typical example. FIG. 1(a) and FIG. 1(b) show an examples of the first lens A of the two lenses to be connected together which have different circular-arc tapered surface 4 inclined with respect to an optical axis L on a periphery of the lens region on the outer periphery rim region. In addition for the second lens B of the two lenses, a bulgy-protrusion-shaped portion 5 with head-top portion milled to be round to correspond to a circular-arc tapered surface 4 of the first lens A along an outer part of the lens region on at least a surface of an outer periphery rim region opposed to the first lens A FIGS. 2(a) to 2(D) show four variations which use three lenses connected together by using the connecting method of lenses for an imaging-device relating to the present invention. The figures show examples of variations of combinations of the first lens (A or B) of the two lenses and the second lens (B for A and C for B) of the two lenses. As is apparent from FIGS. 2(a) to 2(D), the first lens of adjacent two lenses to be connected together has an outer periphery rim region which extends with a certain thickness from an outer periphery edge end portion of the lens region directing to the side of the second lens and the outer periphery rim region which has a circular-arc tapered surface inclined with respect to an optical axis on a outer part of the lens region.

In addition, the second lens of the adjacent two lenses to be connected to the adjacent first lens each other has a bulgy-protrusion-shaped portion with head-top portion milled to be round along an outer part of the lens region on a surface of an outer periphery rim region opposed to the first lens.

By using lenses as described above, lens position adjustment is made by putting the bulgy protrusion-shaped portion of the second lens to the circular-arc tapered surface of the outer periphery rim region of the first lens while performing point contact to join and fix the two lenses each other, then the first lens and the second lens are joined and fixed in the state that the circular-arc tapered surface of first lens and the bulgy-protrusion-shaped portion of the second lens keep a point contact.

Figure 3:
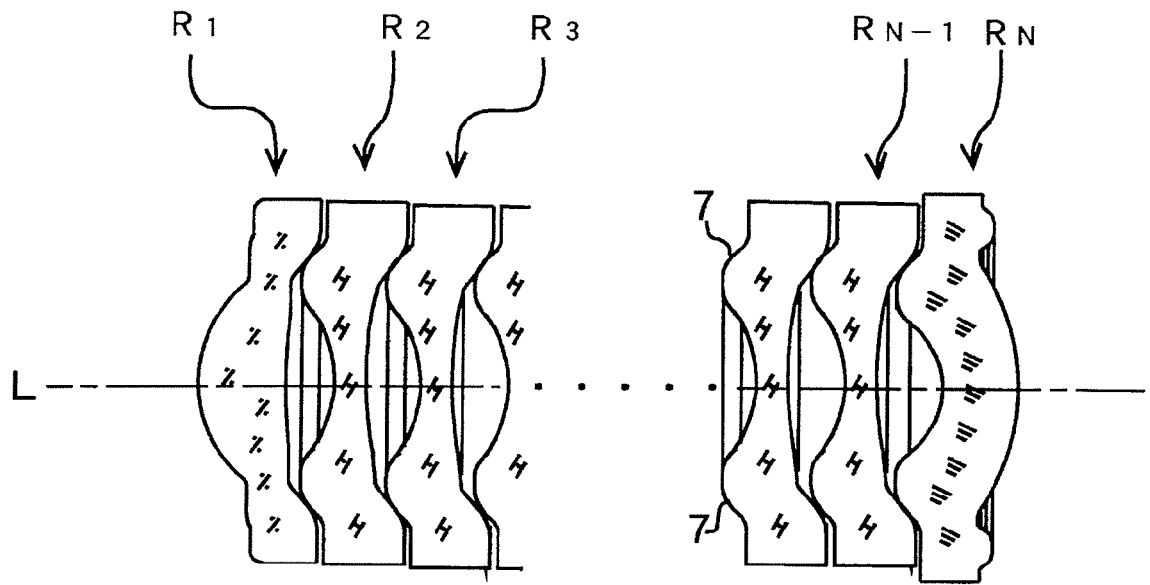
FIG. 3 is a cross sectional view in optical axis direction schematically showing an image of connected N lenses ($R_1$ to $R_N$)

In the connecting method of lenses for an imaging-device relating to the present invention, a description will be given below using a typical lens arrangement pattern among the connecting method of N lenses for an imaging-device in series. The symbol N mentioned here means an integer of N≧2. FIG. 3 is a cross sectional view in optical axis direction schematically showing an image of connected N lenses ($R_1$ to $R_N$). By the way, it is clearly stated here that a drawing for arranging one to N lenses ($R_1$ to $R_N$) is demonstrated to identify the present invention. However, the lens $R_1$ does not always means a lens at the front end on the subject side of the imaging-device. In some cases, the lens $R_N$ may be at the front end on the subject side. However, the following description will be mainly given by supposing the case where the first lens $R_1$ is arranged on the front end on the subject side.

In addition, there is no special upper limit for the number of lenses N. Also, among the N lenses, any lens can be a convex lens, a concave lens, a polarizing lens, a protective lens and the like. However, in order to apply the connecting method of the lenses for an imaging-device relating to the present invention, both a lens region formed in the center part of the lens and an outer periphery rim region formed in an outer periphery portion of the lens region are required.

An explanation on a concept for connecting "an (n--1)-th lens" and "an n-th lens" together in connecting N lenses will be given here. By the way, the symbol n meets the relationship 2≦n (integer)≦N and the lenses $R_{n-1}$ and $R_n$ are in the positions shown in FIG. 3. It means that "an (n–1)-th lens" and "an n-th lens" are connected together in "an outer periphery rim region of the (n–1)-th lens" and "an outer periphery rim region of the n-th lens." So, explanation is better to be performed by extracting "the (n–1)-th lens" and "the n-th lens" of FIG. 3. However, for convenience of explanation, the explanation will be given by using a first lens and a second lens. In addition, FIG. 4(a) shows a cross sectional view in optical axis direction of an (n–1)-th lens (=a first lens) schematically and FIG. 4(b) shows a perspective view schematically.

Figure 4:
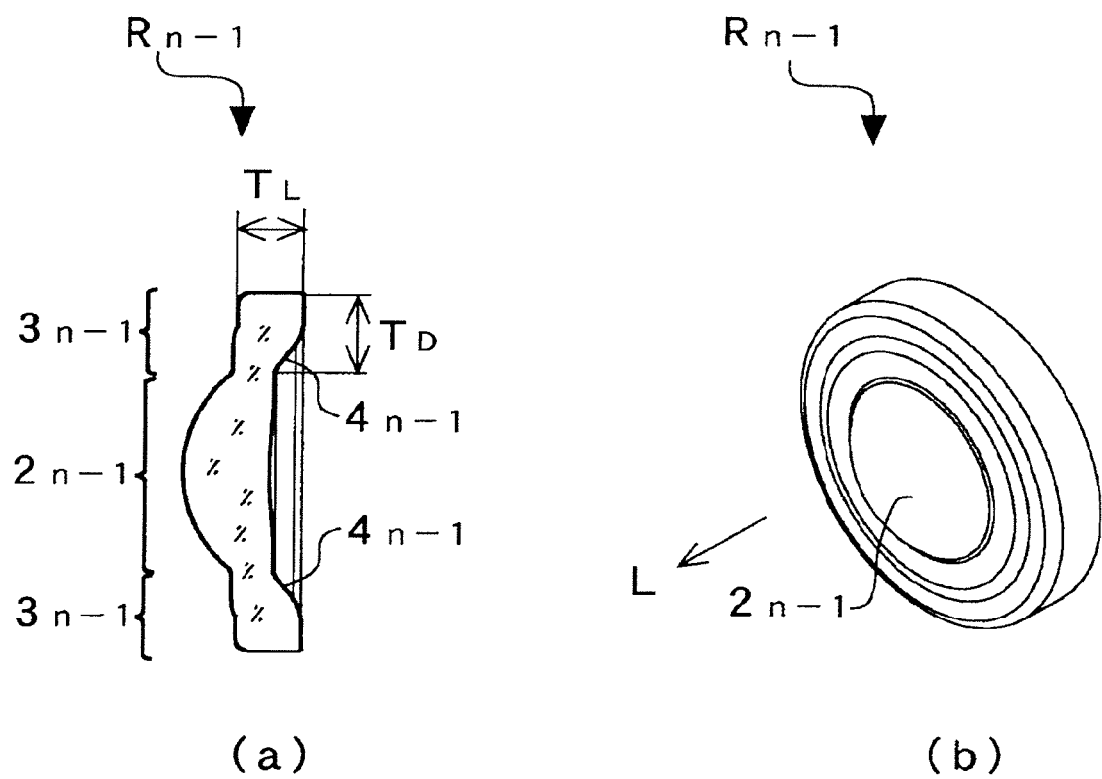
FIGS. 4(a) and 4(b) are cross sectional view in optical axis direction schematically showing an (n−1)-th lens.

The (n–1)-th lens $R_{n-1}$ shown in FIG. 4(a) is such that a lens region $2_{n-1}$ is formed in the center part of the lens, and an outer periphery rim region $3_{n-1}$ is formed in the outer periphery portion of the lens region $2_{n-1}$. And the outer periphery rim region $3_{n-1}$ is formed in an extending manner with a certain thickness from the outer periphery edge end portion of the lens region $2_{n-1}$ toward the side of the n-th lens. Here, a description on "a certain thickness." will be given. The term "A certain thickness" is used in concepts, "a rim thickness in an optical axis direction $T_L$" along the optical axis direction L of a lens and "a rim thickness in the radial direction of a lens $T_D$" perpendicular to the optical axis direction L of a lens. A special restriction is not required for "a rim thickness in an optical axis direction $T_L$" and "a rim thickness in the radial direction of a lens $T_D$," which are thicknesses of the outer periphery rim region, so long as these thicknesses enable at least one shape of either "a circular-arc tapered surface" or "a bulgy-protrusion-shaped portion" to be formed.

As will be understood from FIG. 4(a), for an (n–1)-th lens, it is required that an inner periphery surface extends to the lens region of an outer periphery rim region $3_{n-1}$ of the (n–1)-th lens have a bank-shaped circular-arc tapered surface $4_{n-1}$ inclined from the n-th lens side toward the lens region of an (n–1)-th lens. And the circular-arc tapered surface $4_{n-1}$ performs a connection surface that connects with a bulgy-protrusion-shaped portion $5_n$ of an n-th lens $R_n$, which will be described later.

As shown in FIG. 4(a), it is preferred that the circular-arc tapered surface $4_{n-1}$ have a sectional inclination angle θ with respect to an optical axis in the range of 30° to 60°. It is most preferred that the sectional inclination angle of the circular-arc tapered surface $4_{n-1}$ be 45°. It is because an external force vertically applied to the circular-arc tapered surface (an external force applied to the circular-arc tapered surface by a bulgy-protrusion-shaped portion $5_n$ of an n-th lens $R_n$, which will be described later) can be substantially evenly distributed in both directions of an optical axis direction and a direction perpendicular to an optical axis. However, it is difficult to form a circular-arc tapered surface $4_{n-1}$ having a complete sectional inclination angle of 45°. However, if the sectional inclination angle exists in the range of 30° to 60°, an external force vertically applied to the circular-arc tapered surface does not act extremely unevenly any more either in an optical axis direction or in a direction perpendicular to an optical direction, and it is made possible to make optical axis adjustment at a level similar to the level when the circular-arc tapered surface $4_{n-1}$ is made to be the sectional inclination angle of 45°. It means that if the sectional inclination angle is out of the range 30° to 60°, it is made difficult to make a high-accuracy optical axis adjustment between an n-th lens $R_n$ and an (n–1)-th lens $R_{n-1}$ to be not desirable. Further, when the sectional inclination angle of the circular-arc tapered surface 4 exists in the range of 300 to 60°, the sectional inclination angle of the circular-arc tapered surface $4_{n-1}$ can be optionally selected according to the materials for lenses, the shape of the lens region $2_{n-1}$, the lens size and the like.

Figure 5:
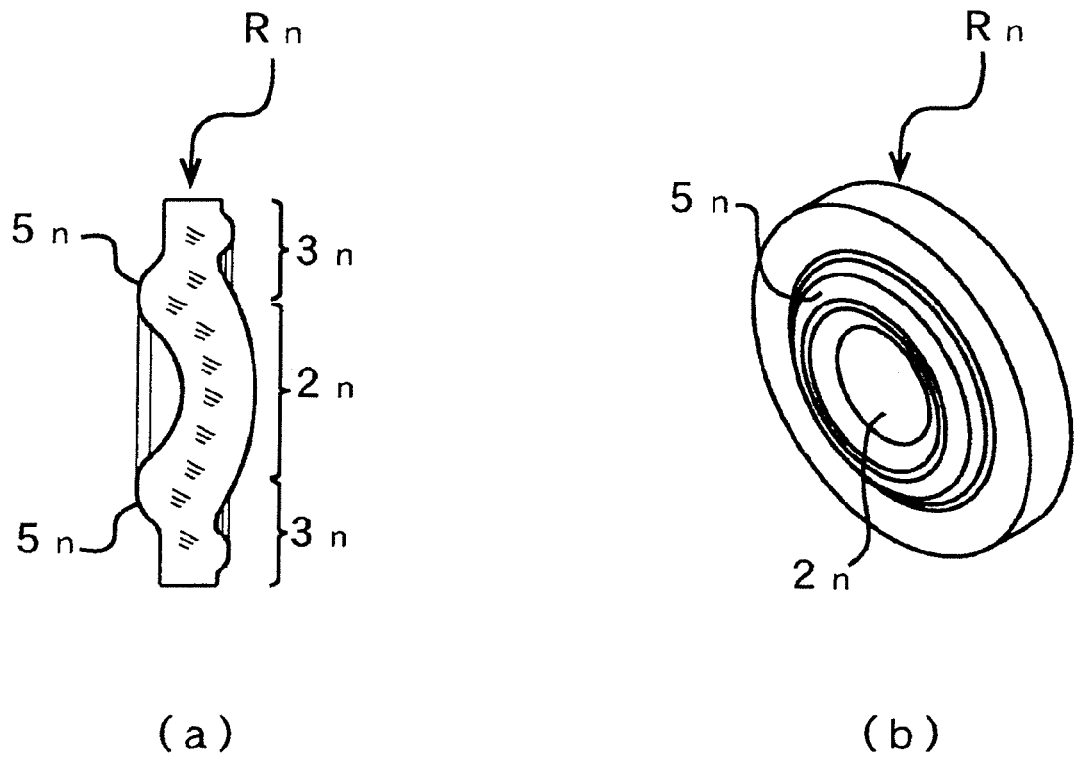
FIGS. 5(a) and 5(b) are cross sectional view in optical axis direction schematically showing an n-th lens.

Next, as will be understood from FIGS. 5(a) and 5(b), an n-th lens $R_n$ has a bulgy-protrusion-shaped portion $5_n$ with head-top portion milled to be round on a surface of an outer periphery rim region $3_n$ opposed to the (n−1)-th lens $R_{n-1}$ side along an outer part of a lens region $2_n$ of the n-th lens. In addition, FIG. 5(a) shows a cross sectional view in optical axis direction of an n-th lens a second lens) schematically and FIG. 5(b) shows a perspective view schematically.

Figure 6:
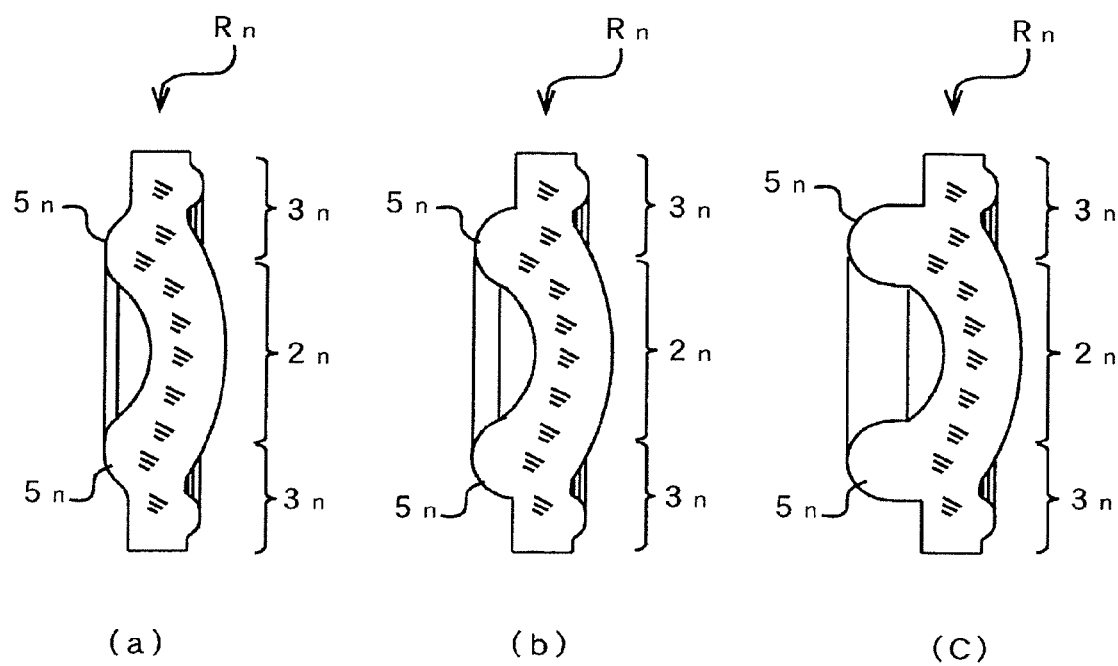
FIGS. 6(a) to 6(C) are cross sectional view in perpendicular to optical axis direction schematically showing a bulgy-protrusion-shaped portion formed in an outer periphery rim region of an n-th lens.

The bulgy-protrusion-shaped portion $5_n$ to be formed on the outer periphery rim region $3_n$ of the above-described n-th lens $R_n$ is to be formed along the outer part of the lens region of the n-th lens, and it is preferred that the shape of the bulgy-protrusion-shaped portion $5_n$ shown in the cross sectional view in perpendicular to optical axis direction is a roughly semicircular-arc shape or a dome shape as shown in any of FIGS. 6(a) to 6(C). By forming in such sectional shapes, a good condition for point contact with the circular-arc tapered surface $4_{n-1}$ of the (n−1)-th lens is performed and an arrangement condition at a level free from the optical axis adjustment of both lenses is obtained. In addition, the height 6 of the bulgy-protrusion-shaped portion is important as a factor for adjusting the lens-to-lens spacing between the (n−1)-th lens $R_{n-1}$ and the n-th lens $R_n$, i.e. the lens-to-lens spacing specified for imaging-devices. Therefore, it might be confirmed that it is not required to specify a special restriction to the concept of the height of the protrusion-shaped portion. By the way, the term "adjustment of lens position" mentioned in the present invention is to perform accurate positioning of the (n−1)-th lens $R_{n-1}$ and the n-th lens $R_n$ by contacting these lenses each other to make point contact condition between the tapered surface and the bulgy-protrusion-shaped portion in cross sectional view in optical axis direction, and performing sufficient optical axis alignment and an accurate lens-to-lens spacing adjustment.

Figure 7:
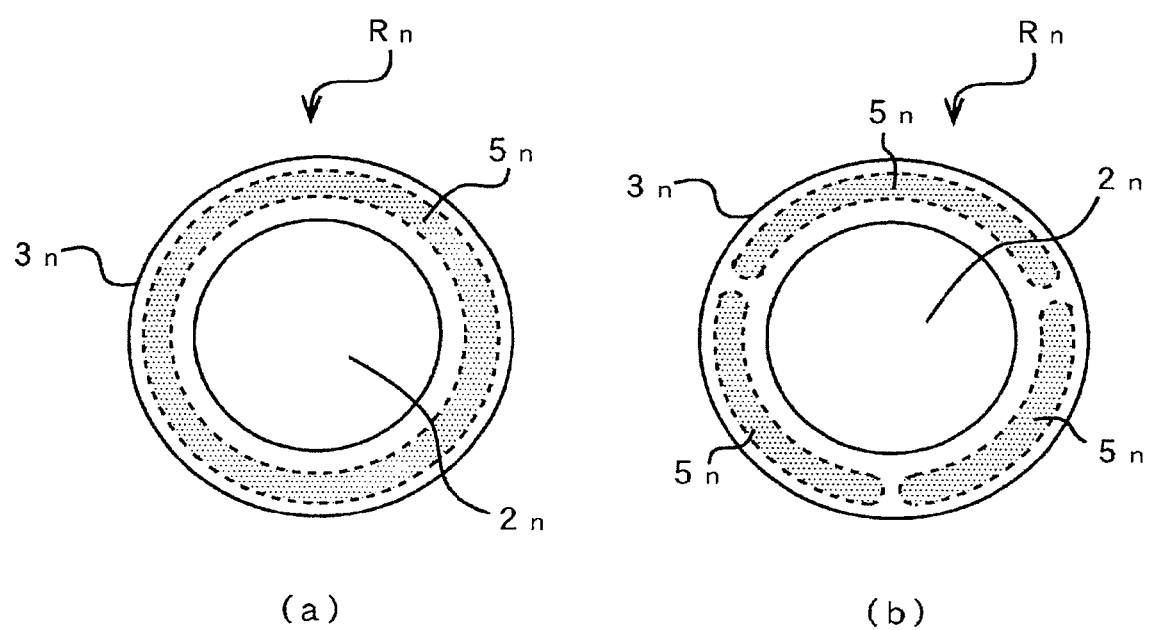
FIGS. 7(a) and 7(b) are front views of an n-th lens for the understanding of a bulgy-protrusion-shaped portion formed on an outer periphery rim region of an n-th lens.

The bulgy-protrusion-shaped portion $5_n$ to be formed in the outer periphery rim region $3_n$ of the n-th lens $R_n$ is formed in areas indicated by broken lines in FIGS. 7(a) and 7(b) showing the front view of the n-th lens $R_n$. In addition, FIG. 7(a) shows a bulgy-protrusion-shaped portion $5_n$ formed in a continuous state along the outer part of the lens region $2_n$ of the n-th lens $R_n$. And FIG. 7(b) shows a bulgy-protrusion-shaped portion $5_n$ formed in a discontinuous state along the outer part of the lens region $2_n$ of the n-th lens $R_n$. In the case shown in FIG. 7(b), divided sub-bulgy-protrusion-shaped portions $5_{n(1)}$ to $5_{n(3)}$ constitute the bulgy-protrusion-shaped portion $5_n$ along the outer part of the lens region $2_n$ of the n-th lens $R_n$. And the sub-bulgy-protrusion-shaped portions are preferred to be formed in numbers 3 or more, because it is easy to ensure positioning accuracy in connecting the (n−1)-th lens $R_{n-1}$ and the n-th lens $R_n$ together. Furthermore, there is no special restriction to the length of the sub-bulgy-protrusion-shaped portion.

Figure 8:
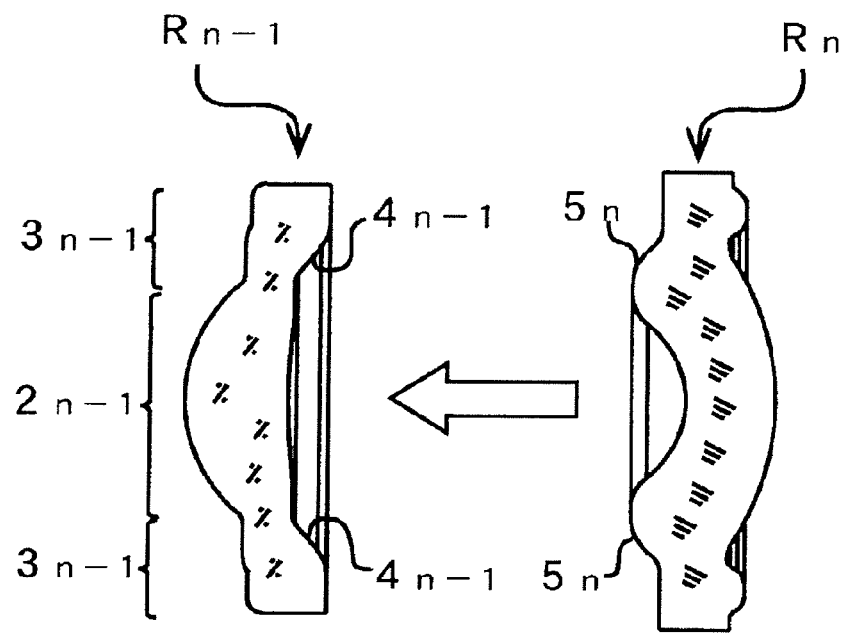
FIGS. 8(a) and 8(b) are cross sectional view in optical axis direction to explain the connection condition between an (n−1)-th lens and an n-th lens.
Figure 8:
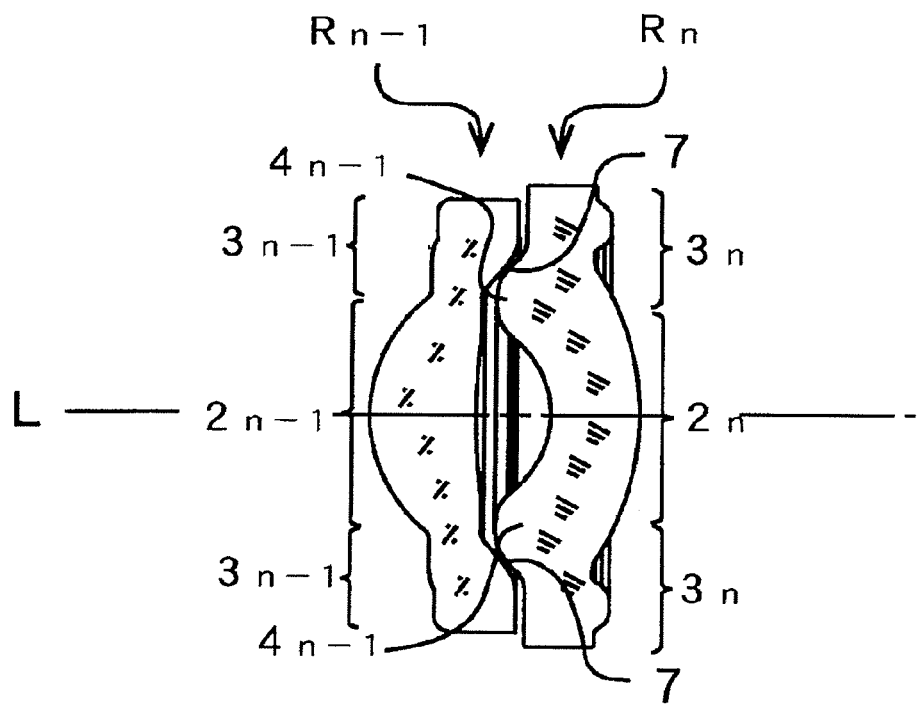

As shown in FIG. 8(a), the connecting of an (n−1)-th lens $R_{n-1}$ and an n-th lens $R_n$ described above is performed through finishing of the positioning of the lenses by contacting the bulgy-protrusion-shaped portion $5_n$ of the n-th lens $R_n$ to the circular-arc tapered surface $4_{n-1}$ of the outer periphery rim region $3_{n-1}$ of the (n−1)-th lens $R_{n-1}$ in a point contact condition at a contact point 7 followed by pasting the n-th lens $R_n$ and (n−1)-th lens $R_{n-1}$ to be fixed together with an adhesive and the like. As a result, as shown in FIG. 8(b), the circular-arc tapered surface of the (n−1)-th lens and the bulgy-protrusion-shaped portion of the n-th lens are joined and fixed in a point contact condition. In addition, because n-th lens $R_n$ and (n−1)-th lens $R_{n-1}$ are in a point contact condition, the adjustment of the lens position can be easily performed by separating the lenses from each other to repair optical axis alignment again before the pasting with an adhesive and the like is finished.

When viewed in cross section in the optical axis direction, the circular-arc tapered surface $4_{n-1}$ of the (n−1)-th lens $R_{n-1}$ and the bulgy-protrusion-shaped portion $5_n$ of the n-th lens $R_{n-1}$ contact on the point 7. That is, the condition in which these lenses are pasted together because the circular-arc tapered surface $4_{n-1}$ of the (n−1)-th lens $R_{n-1}$ and the bulgy-protrusion-shaped portion $5_n$ of the n-th lens $R_n$ contact with each other maintains a good optical axis adjustment and an appropriate lens-to-lens spacing. Various methods can be applied for the pasting, applying an adhesive, the fusion bonding at the outer periphery rim portion of the (n−1)-th lens $R_{n-1}$ and the outer periphery rim portion of the n-th lens $R_n$ by heating and any other methods may be used so long as the method can past the lenses together. As described above, it is made possible to assemble the lens unit 1 by connecting N lenses together in such manner. In the lens unit obtained by connecting N lenses by the above-described lens connecting methods, the lenses are connected together with a suitable optical axis maintained to give the lens unit full play in optical performance.

Followings will be clearly stated for precautionary purposes. When the first lens $R_1$ is assumed to be arranged at front end on the subject side, $R_1$ is required to be provided at least a circular-arc tapered surface similar to the circular-arc tapered surface $4_{n-1}$ of the outer periphery rim region $3_{n-1}$ of the (n−1)-th lens $R_{n-1}$ in the above description in an outer periphery rim region $3_1$ opposed to the second lens $R_2$. In contrast, the n-th lens $R_n$ to be arranged at front end to the focus side is required to be provided with at least a bulgy-protrusion-shaped portion $5_n$ similar to the bulgy-protrusion-shaped portion $5_n$ formed on a surface of the outer periphery rim region $3_n$ of the n-th lens $R_n$ on the (n−1)-th lens $R_{n-1}$ side in the above description. Among the N lenses, a lens arranged midway (2≦n (integer)≦N−1) will be provided both a circular-arc tapered surface similar to the circular-arc tapered surface $4_{n-1}$ of the outer periphery rim region $3_{n-1}$ of the (n−1)-th lens $R_{n-1}$ in the above description and a bulgy-protrusion-shaped portion similar to the bulgy-protrusion-shaped portion $5_n$ formed on a surface of the outer periphery rim region $3_n$ of the n-th lens $R_n$ on the (n−1)-th lens $R_{n-1}$ side in the above description. In addition, it is clearly stated that there is a case when the n-th lens $R_n$ is arranged at the front end on the subject side, a concept similar to the above-described concept can be applied also.

For the (n−1)-th lens $R_{n-1}$ and the n-th lens $R_n$, materials should be selected in consideration of the optical characteristics as lenses, impact resistance, thermal characteristics and the like. It is preferable to apply resin-based lenses using acrylic resins, polycarbonate resins, and the like as plastic resins which may qualify requirements on the lenses for imaging-devices. The features of a resin-based lens are light weight and low price. Also, resin-based lenses enables mass production and are excellent in production cost in addition to the easy processing in both molding for manufacturing and polishing of the lenses. Therefore, in the connecting methods of imaging-device lenses relating to the present invention, it is preferable to construct the lens unit 1 by using resin-based lenses for all of the N lenses.

However, when compared to glass-based lenses, volume changes of lenses caused by temperature change and/or humidity change tends to occur. Therefore, it is said that the refractive index tends to change due to the environment. If the volume of a lens changes, the focal length changes to result inferior quality of images recorded. In contrast, volume changes of a glass-based lenses due to temperature, humidity and the like as described above are less than a plastic lenses. Therefore, to perform higher-quality imaging than in the case where the lens unit 1 constructed by only a resin-based lenses is used, it is preferable to use a glass-based lens which is said that volume changes of lenses due to the temperature and humidity of the environment are less than plastic lenses. Therefore, it is anxious and most preferable to use only glass-based lenses in the connecting method of lenses for an imaging-device relating to the present invention.

It is also possible to reduce deviations in optical characteristics as far as possible due to the environment by constructing the lens unit 1 in combination of a resin-based lens and a glass-based lens. For example, use a resin-based lens in the (n−1)-th lens $R_{n-1}$ and use a glass-based lens in the n-th lens $R_n$. In contrast, use a glass-based lens in the (n−1)-th lens $R_{n-1}$ and use a resin-based lens in the n-th lens $R_n$. Furthermore, use a glass-based lens for only in the first lens $R_n$ and use a resin-based lenses for other lenses $R_2$ to $R_n$. It is also possible to construct the lens unit 1, for example, by alternately arranging a resin-based lenses and a glass-based lens.

Figure 9:
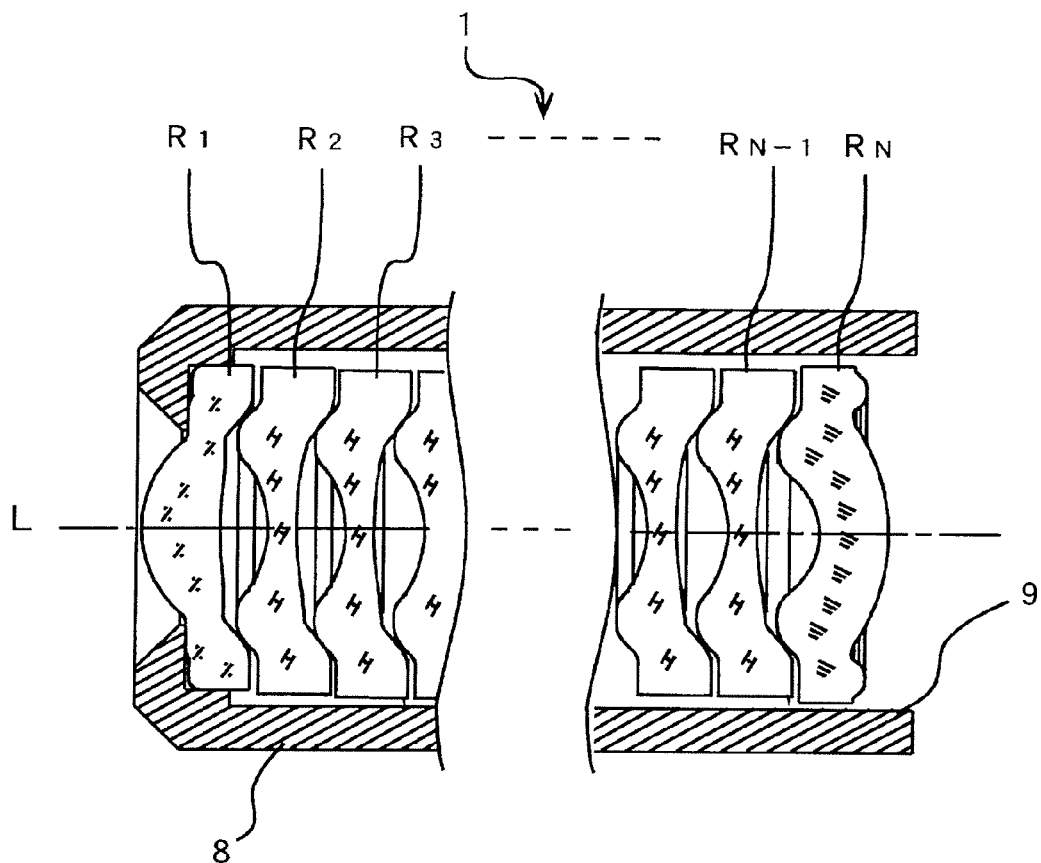
FIG. 9 is a cross sectional view in optical axis direction to explain the housing condition of a lens unit relating to the present invention in a lens housing.

The above-described lens unit 1 performs good optical axis alignment during the construction procedure of lenses only when N lenses for an imaging-device are used to be connected together in series. As shown in FIG. 9, in the lens unit 1, only the first lens $R_n$ is fixed to the shaped portion on the inner wall surface 9 of the lens housing 8, and other lenses may not contact with the shaped portion on the inner wall surface 9 of the lens housing 8. Therefore, accuracy to be considered is only required to finishing of the inner wall surface 9 of the lens housing 8 in terms of the relation to the first lens $R_1$. So, it is not required to consider the finishing accuracy of the whole inner wall surface 9 of the lens housing 8.

Figure 10:
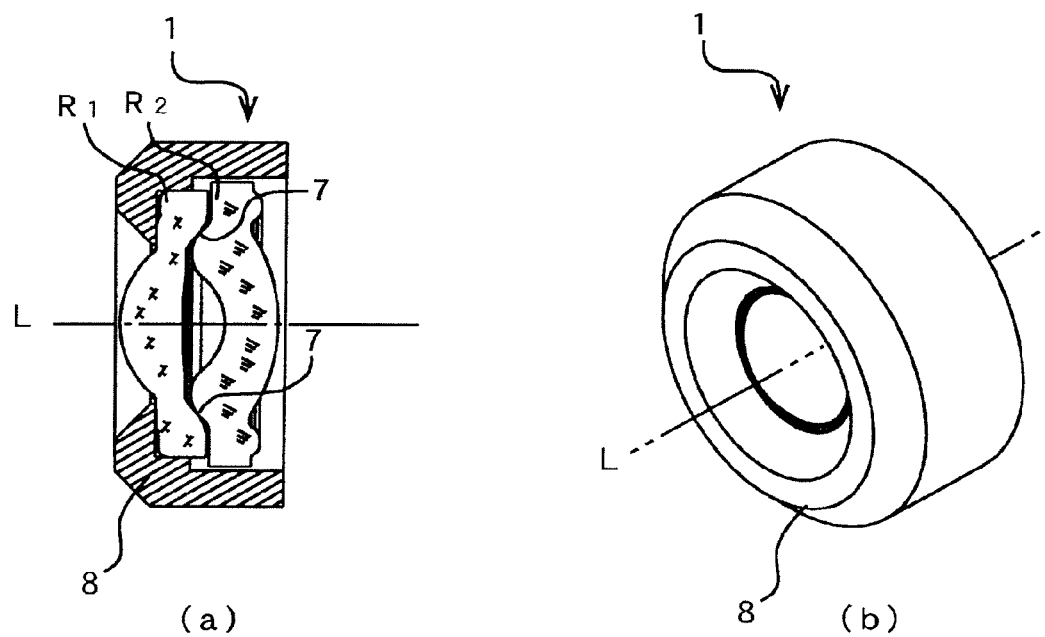
FIGS. 10(a) and 10(b) are a cross sectional view in optical axis direction and a perspective view, respectively, schematically showing the state of a lens unit composed of a first lens and a second lens connected together by using a connecting method of lenses relating to the present invention in a lens housing.
Figure 11:
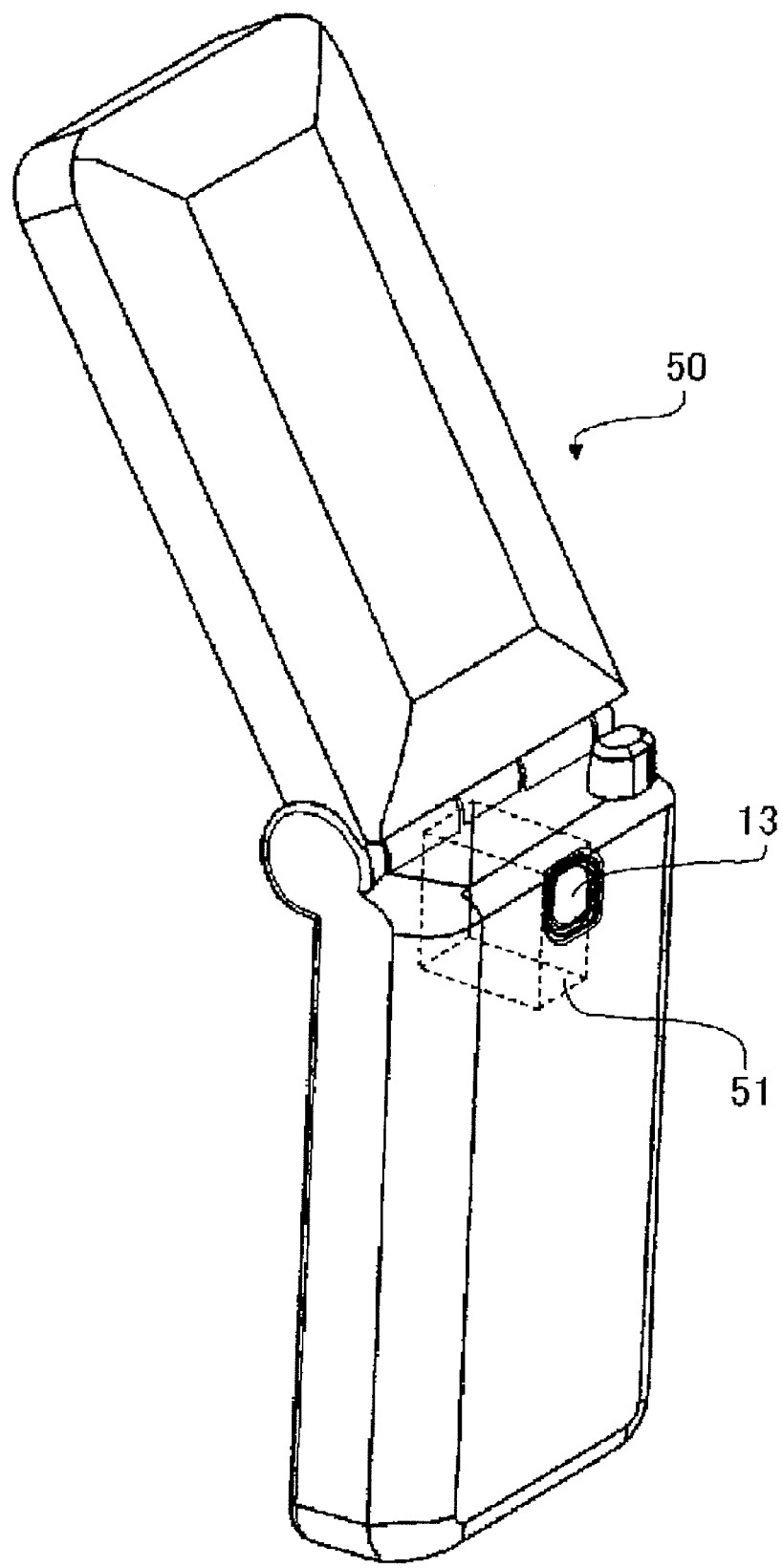
FIG. 11 is a diagram illustrating an imaging-device comprising the lens unit shown in FIGS. 10(a) and 10(b)
Figure 12:
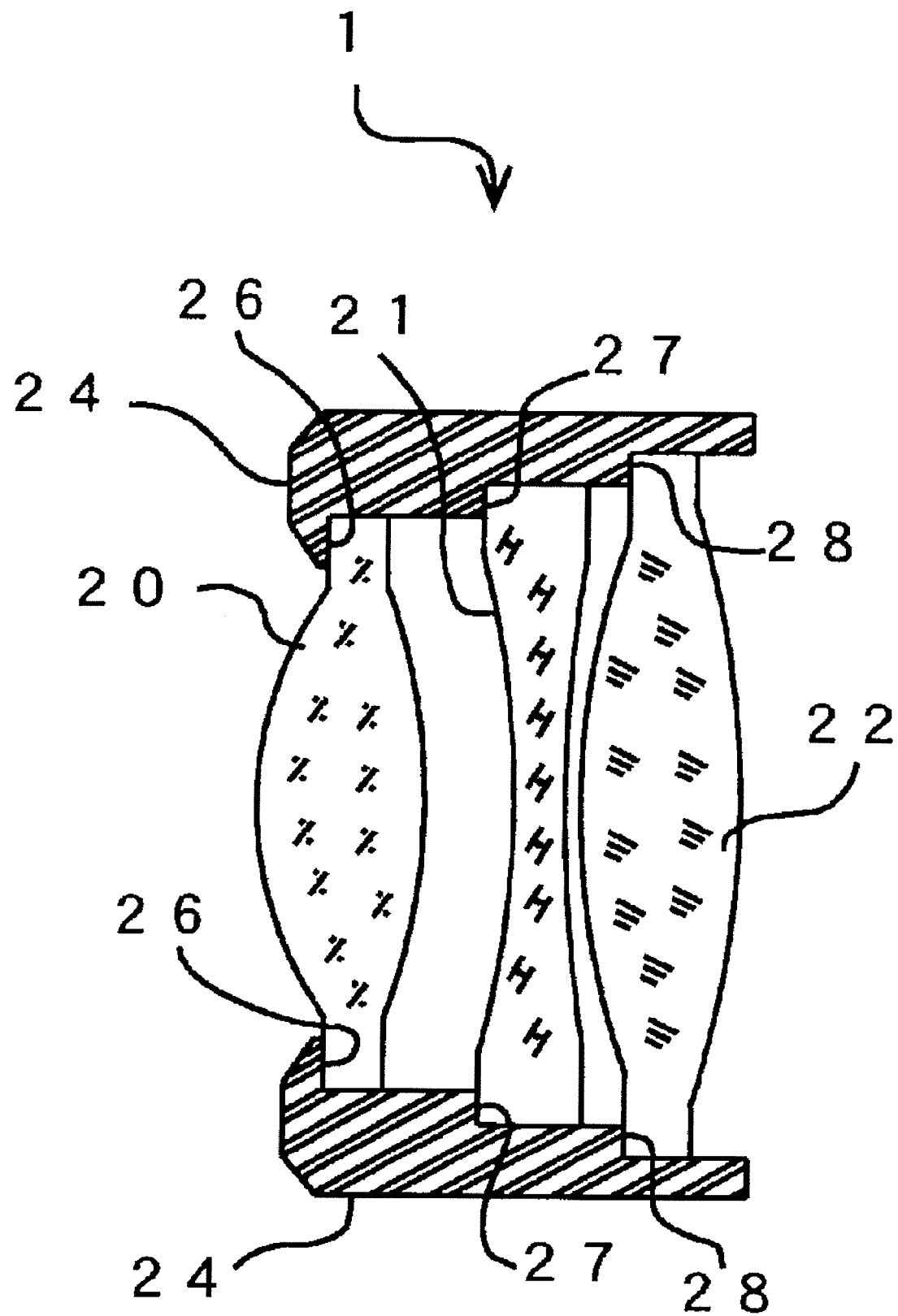
FIG. 12 is a schematic diagram to explain a conventional method of arranging lenses by using tubings formed on an inner periphery surface of a lens housing.

FIGS. 10(a) and 10(b) show a cross sectional view in the optical axis direction and a perspective view, respectively, of the state of the lens unit 1 installed in the lens housing 8, in which the first lens $R_1$ and the second lens $R_2$ is connected together by using the connecting method of lenses for an imaging-device relating to the present invention. The lens unit 1 of FIGS. 10(a) and 10(b) installed in the lens housing 8 is suitable for an imaging-device 30 of a cell phone 40 provided with a camera, which is shown in FIG. 11. The lens unit 1 built in this cell phone 40 provided with a camera features the use of the connecting method of lenses for an imaging-device described above.

The connecting method of lenses for an imaging-device relating to the present invention enables the optical axis adjustment of a plurality of lenses to be connected together with high accuracy easy in spite of a simple construction. In addition, it is also easy to ensure a stable lens-to-lens spacing of N lenses and it is made possible to maintain good optical performance as a lens unit. Therefore, if a lens unit constructed by using the connecting method of lenses for an imaging-device relating to the present invention is installed, it is made possible to easily improve the optical characteristics of an imaging-device without using a complex structure and/or technique. Therefore, the lens unit relating to the present invention can further increase the effect in image quality improving means, such as increasing the number of pixels as an imaging-device and improving the performance of a small imaging-device itself. As a result, it enables providing of an imaging-device which performs higher quality than conventional imaging-devices to the market.

What is claimed is:

1. A method for connecting N lenses (where N (integer)>2) for an imaging-device in series, wherein each of the N lenses has a lens region in a center part and an outer periphery rim region formed on an outer part of the lens region, wherein the first lens of adjacent two lenses to be connected together has an outer periphery rim region which extends with a certain thickness from an outer periphery edge end portion of the lens region directing to the side of the second lens and the outer periphery rim region which has a circular-arc tapered surface inclined with respect to an optical axis on a outer part of the lens region, wherein the second lens of the adjacent two lenses to be connected together to each other has a bulgy-protrusion-shaped portion with head-top portion milled to be round along an outer part of the lens region on a surface of an outer periphery rim region opposed to the first lens, and wherein lens position adjustment is made by putting the bulgy protrusion-shaped portion of the second lens to the circular-arc tapered surface of the outer periphery rim region of the first lens while performing point contact to join and fix the two lenses each other, then the first lens and the second lens are joined and fixed in the state that the circular-arc tapered surface of first lens and the bulgy-protrusion-shaped portion of the second lens keep a point contact.

2. The method of connecting N lenses (where N (integer)>2) for an imaging-device in series according to claim 1, wherein each of the N lenses has a lens region in a center part and an outer periphery rim region formed on an outer part of the lens region, wherein an (n−1)-th lens (where $2 \leqq n$ (integer)$\leqq N$) among the N lenses (herein after "(n−1)-th lens") has an outer periphery rim region which extends with a certain thickness from an outer periphery edge end portion of the lens region directing to the side of an n-th lens among the N lenses (herein after "n-th lens"), and an inner periphery surface of the outer periphery rim region connecting to the lens region of the (n−1)-th lens has a bank-shaped circular-arc tapered surface inclined from the n-th lens side to a lens region of the (n−1)-th lens, wherein an n-th lens (where $2 \leqq n$ (integer)$\leqq N$) has a bulgy-protrusion-shaped portion with head-top portion milled to be round along an outer part of the lens region on a surface of an outer periphery rim region opposed to the (n−1)-th lens, and wherein lens position adjustment is made by putting the bulgy protrusion-shaped portion of the n-th lens to the circular-arc tapered surface of the outer periphery rim region of the first lens while performing point contact to join and fix the two lenses each other, then the (n−1)-th lens and the n-th lens are joined and fixed in the state that the circular-arc tapered surface of (n−1)-th lens and the bulgy-protrusion-shaped portion of the n-th lens keep a point contact.

3. The method of connecting N lenses for an imaging-device according to claim 2, wherein the circular-arc tapered surface formed in the outer periphery rim region of the (n−1)-th lens has a sectional inclination angle in the range of 300 to 60° with respect to an optical axis.

4. The method of connecting N lenses for an imaging-device according to claim 2, wherein the bulgy-protrusion-shaped portion formed in the outer periphery rim region of the n-th lens is formed along an outer part of the lens region of the n-th lens, and wherein the width-direction sectional shape of the bulgy-protrusion-shaped portion is a roughly semicircular-arc shape or a dome shape.

5. The method of connecting N lenses for an imaging-device according to claim 2, wherein the bulgy-protrusion-shaped portion formed in the outer periphery rim region of the n-th lens is a continuous or discontinuous shape along an outer part of the lens region of the n-th lens.

6. The method of connecting N lenses for an imaging-device according to claim 1, wherein all of N imaging-device lenses (where N (integer)$\geq$2) used are a resin-based lens.

7. The method of connecting N lenses for an imaging-device according to claim 1, wherein N imaging-device lenses (where N (integer)$\geq$2) used are combination of a resin-based lens and a glass-based lens.

8. A lens unit obtained by connecting N lenses (where N (integer)$\geq$2) in series by using the connecting method of N lenses for an imaging-device according to claim 1.

9. An imaging-device comprising a lens unit according to claim 8 in which the N lenses (where N (integer)$\geq$2) are connected in series and is installed in a lens housing.

* * * * *